United States Patent [19]

Fujitomi et al.

[11] Patent Number: 4,674,277
[45] Date of Patent: Jun. 23, 1987

[54] SECONDARY AIR SUPPLY SYSTEM FOR AN ENGINE EXHAUST GAS PURIFYING SYSTEM

[75] Inventors: Tetsuo Fujitomi; Masamichi Iida; Kiminobu Kato, all of Hiroshima, Japan

[73] Assignee: Mazda Motor Corporation, Hiroshima, Japan

[21] Appl. No.: 888,017

[22] Filed: Jul. 22, 1986

[30] Foreign Application Priority Data

Jul. 26, 1985 [JP] Japan ............................ 60-114660[U]

[51] Int. Cl.$^4$ ............................................. F01N 3/30
[52] U.S. Cl. ....................................................... 60/293
[58] Field of Search .......................................... 60/293

[56] References Cited

U.S. PATENT DOCUMENTS 3,665,712  5/1972  Tenney ................................. 60/314
4,319,452  3/1982  Morita ................................. 60/293
4,433,541  2/1984  Amano ................................. 60/293

FOREIGN PATENT DOCUMENTS 50-60419  6/1975  Japan .
52-1320   1/1977  Japan .

Primary Examiner—Douglas Hart
Attorney, Agent, or Firm—Fleit, Jacobson, Cohn & Price

[57] ABSTRACT

A secondary air supply system for an engine exhaust system in which the secondary air is drawn to the engine exhaust passage under the suction pressure produced in the exhaust passage. The secondary air supply system includes a non-return valve connected with the engine exhaust passage and an expansion chamber connected with the non-return valve through an elongated connecting passage. The expansion chamber is formed in a casing and the non-return valve is located in a valve chamber formed in the casing and separated from the expansion chamber by a partition wall. The connecting passage is formed by a pipe extending in the expansion chamber from the partition wall.

13 Claims, 4 Drawing Figures

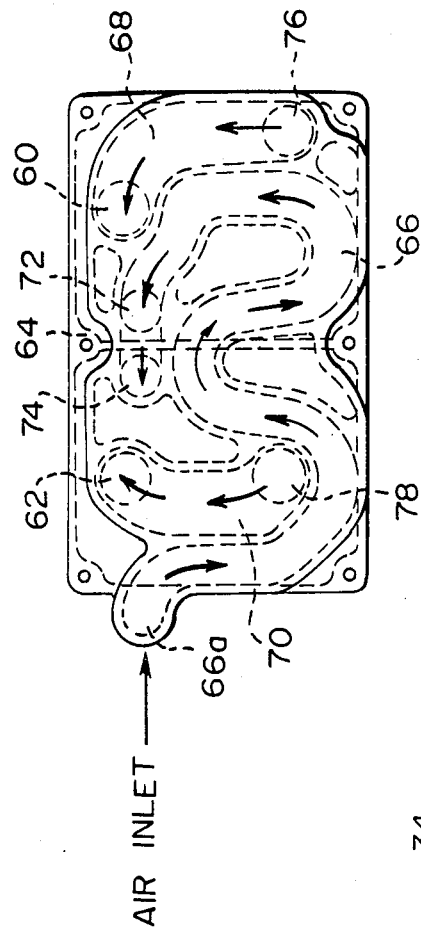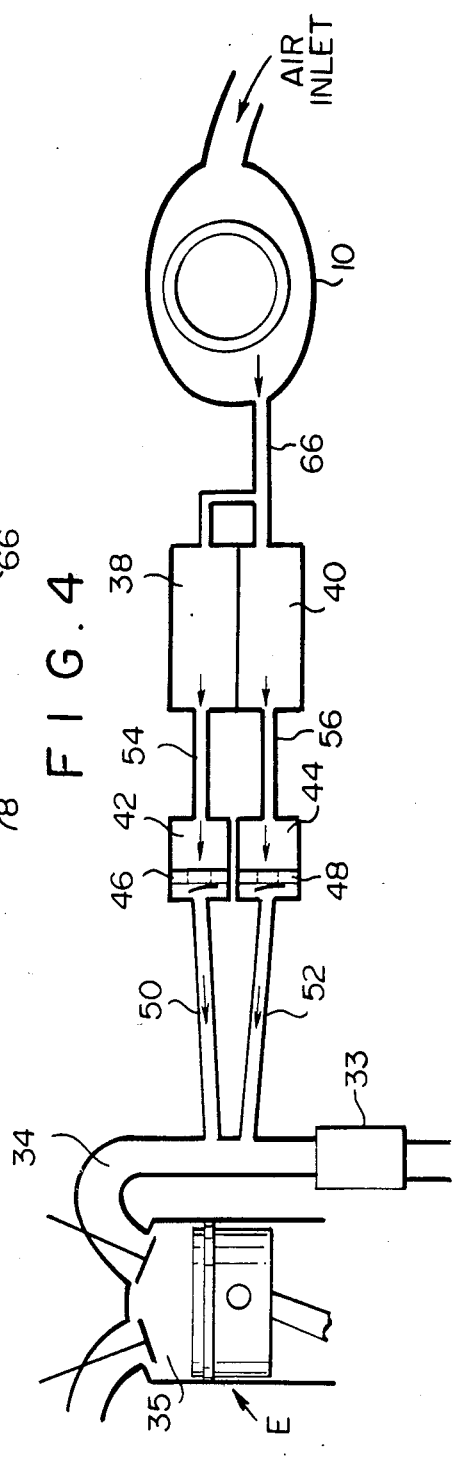

SECONDARY AIR SUPPLY SYSTEM FOR AN ENGINE EXHAUST GAS PURIFYING SYSTEM

BACKGROUND OF THE INVENTION

1. Field of the Invention

The present invention relates to an exhaust system for an internal combustion engine, and more particularly to a secondary air supply system for an engine exhaust gas purifying system. More particularly, the present invention pertains to a secondary air supply system wherein the air is drawn to the engine exhaust system under a suction pressure produced in the exhaust system.

2. Description of the Prior Art

In an engine exhaust system, there are pulsations of exhaust gas pressure wherein positive and negative pressures are alternately produced. Therefore, it is possible to draw the external air into the exhaust system by utilizing the negative pressure of the pulsations. In a secondary air supply system wherein the air is drawn under the suction pressure produced in the engine exhaust system, however, there is a possibility of exhaust gas blow back into the secondary air supply system under the positive exhaust gas pressure which produces unpleasant noises. In order to avoid such exhaust gas blow back and the noises caused thereby, a non-return valve may be provided in the passage of the secondary air. It has however been found that the non-return valve is not completely satisfactory in preventing the exhaust gas blow back and the noises caused thereby.

Japanese utility model application No. 48-117893 filed on Oct. 9, 1973 and disclosed for public inspection on June 4, 1975 under the disclosure number 50-60419 proposes a system which includes an expansion chamber provided in the secondary air passage upstream the non-return valve so that a noise attenuator is formed in the passage. In the proposed system, when combustible substances in the exhaust gas are burnt in the after-burning chamber and a high pressure combustion gas is produced, a part of the combustion gas tends to flow back into the secondary air passage. The non-return valve functions to block the reverse flow of the combustion gas, however, a small portion of the combustion gas may leak through the non-return valve. The portion of the combustion gas which has leaked through the non-return valve is then flowed into the expansion chamber where the gas is expanded. In this manner, the noise can be attenuated as in a conventional exhaust noise attenuator. It should however be noted that the proposed system is not completely satisfactory, either, in attenuating the noise to a satisfactory level. Further, since the expansion chamber of substantial volume is provided in the vicinity of the non-return valve, the flow of the secondary air to the exhaust passage is weakened so that a sufficient quantity of air cannot be introduced into the exhaust passage.

A desired quantity of air supply can be ensured by connecting the expansion chamber with the non-return valve through a narrow passage. However, this solution produces a further problem. It has been recognized that the noise caused by the blow back of the combustion gas into the secondary air passage generally includes low frequency components which are based on the exhaust gas noise transmitted through the non-return valve and medium and high frequency components which are produced at the non-return valve when the valve operates. The high frequency components can resonate with the secondary air passage between the expansion chamber and the non-return valve producing noticeable noises.

Japanese patent application No. 50-78130 filed on June 24, 1975 and published for public inspection on Jan. 7, 1977 under the disclosure number 52-1320 proposes to provide the secondary air supply system with an expansion chamber upstream the non-return valve for suppressing the low frequency noise components. The expansion chamber is connected with the non-return valve through a narrow secondary air passage which may be effective to ensure a sufficient supply of the secondary air. In order to prevent the medium and high frequency noise, there is provided a resonance chamber around the secondary air passage. It should however be noted that the proposed system is disadvantageous in that the system becomes bulky because of the expansion chamber and the resonance chamber. The resonance chamber may be substituted by extending the passage between the non-return valve and the expansion chamber to an appropriate length, however, this solution has a problem in that the system possesses an excessive overall length.

SUMMARY OF THE INVENTION

It is therefore an object of the present invention to provide a secondary air supply system for an engine exhaust system which is compact but can ensure sufficient quantity of secondary air supply and has a satisfactory noise suppressing capability.

Another object of the present invention is to provide a novel structure of the secondary air supply system which has an expansion chamber and resonance passage which are arranged in a compact manner.

According to the present invention, the above and other objects can be accomplished by a secondary air supply system for an engine exhaust system including casing means having first chamber means and second chamber means which is smaller in volume than the first chamber means, secondary air passage means comprising a first air passage connecting said second chamber means with an engine exhaust passage means, a second air passage connecting said first chamber means with said second chamber means and a third air passage connecting said first chamber means with the atmosphere, non-return valve means provided in said second chamber means to open only toward the engine exhaust passage means, said casing means having side wall means, cover plate means attached to said side wall means for providing at least part of said secondary air passage means between said side wall means and said cover plate means.

According to the structure described above, the first chamber means provides the expansion chamber and the second chamber means provides a valve chamber wherein the non-return valve is located. By providing at least a part of the secondary air passage between the side wall means and the cover plate means, it becomes possible to define a sufficient passage length for suppressing the medium and high frequency noise components without increasing the overall size of the secondary air supply system.

According to a preferable aspect of the present invention, the secondary air supply system includes casing means having first chamber means and second chamber means which is smaller than and separated from the first chamber means by partition wall means, first air passage means having one end opened to said second chamber means and the other end opened to engine exhaust passage means, second air passage means having one end opened through said partition wall means to said second chamber means and extending through said first chamber means, said second air passage means further extending through side wall means at a side opposite to the second chamber means to the exterior of the casing means and having the other end opened through said side wall means to said first chamber means, third air passage means having one end opened to said first chamber means and the other end opened to the atmosphere, non-return valve means provided in said second chamber means to open only toward said engine exhaust passage means.

According to a specific feature of the present invention, the secondary air supply system includes a hollow casing having one end closed by an end wall and the other end open, said end wall having a recess at an external surface, a substantially planar plate attached to said casing to close said other end of the casing, a conduit extending through said casing between the end wall and said planar plate, said conduit having one end opened through said end wall to said recess and the other end opened through said planar plate to the outside of the planar plate, a cover plate attached to the outside of said planar plate to define with said planar plate a first passage connecting said conduit with the inside of said casing and a second passage opening the inside of the casing to the atmosphere, a valve cover attached to said end wall for closing an open end of said recess to define a valve chamber, a third passage connecting said recess with an engine exhaust passage, a non-return valve provided in said recess to open only toward said exhaust passage.

The above and other objects and features of the present invention will become apparent from the following descriptions of a preferred embodiment taking reference to the accompanying drawings.

BRIEF DESCRIPTION OF THE DRAWINGS

FIG. 3 is an end view as seen in the direction of an arrow A in FIG. 2; and,

FIG. 4 is a diagrammatical view showing the secondary air supply system in an extended state.

DESCRIPTION OF THE PREFERRED EMBODIMENT

Figure 1:
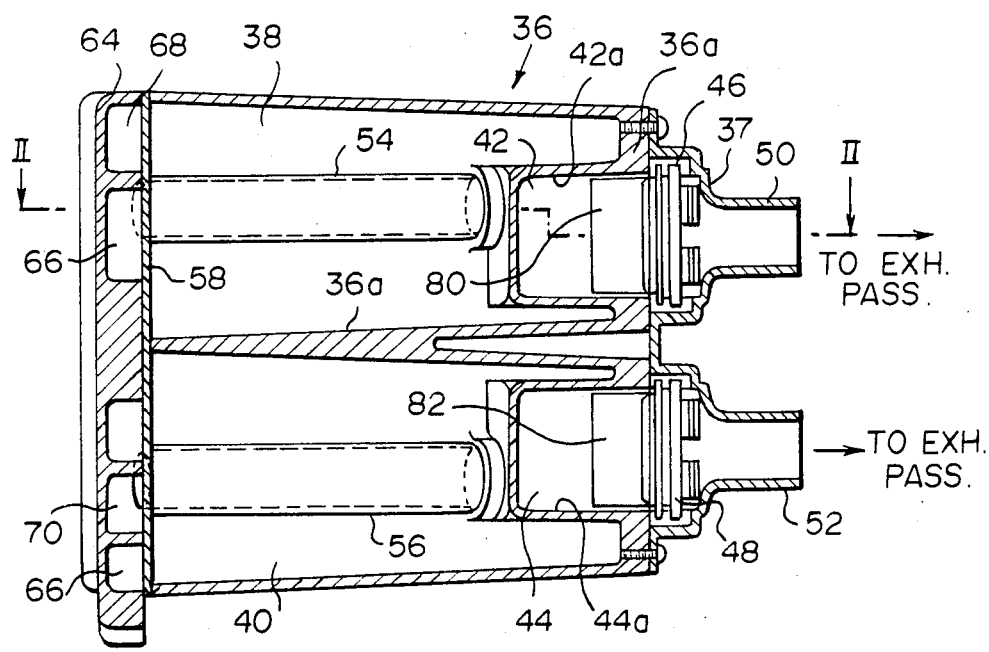
FIG. 1 is a sectional view taken substantially along the line I—I in FIG. 2.

Referring now to the drawings, particularly to FIG. 4, there is shown an expanded view of a secondary air supply system to which the present invention can be applied. The secondary air supply system includes an air-cleaner 10 which has an air outlet connected with an air inlet passage 66. The inlet passage is divided at the downstream end into two branch passages which are respectively connected with expansion chambers 38 and 40. The branch passages 38 and 40 are respectively connected through passages 54 and 56 with valve chambers 42 and 44 in which non-return valves 46 and 48 are located, respectively. The valve chambers 42 and 44 are respectively connected through elongated air passages 50 and 52 with an exhaust passage 34 of an engine E which extends from a combustion chamber 35. As well known in the art, the exhaust passage is provided with a catalytic device 33. The non-return valves 46 and 48 are of reed type and positioned so that they open only toward the exhaust passage 34.

Figure 2:
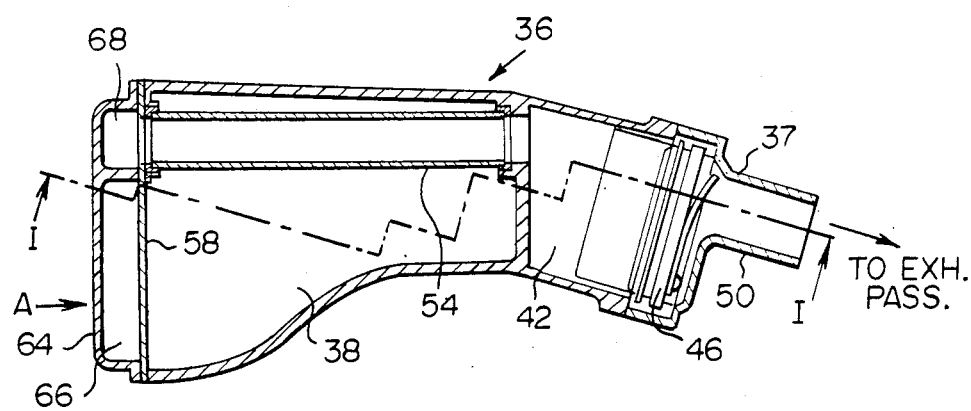
FIG. 2 is a vertical sectional view taken substantially along the line II—II in FIG. 1.

Referring now to FIGS. 1 through 3, it will be noted that the secondary air supply system in accordance with one embodiment of the present invention includes a casing 36 made of a casting metal. In the casing 36, there are formed the aforementioned pair of expansion chambers 38 and 40 which are separated from each other by means of a partition wall 36a. The valve chambers 42 and 44 are formed at one ends of respective expansion chambers 38 or 40. The valve chambers 42 and 44 are formed by providing recesses 42a and 44a in an end wall 36a which closes one end of the casing 36. An end plate or outlet block 37 is attached to the casing 36 at the aforementioned one end of the casing 36 to close the open ends of the recesses 42a and 44a. The outlet block 37 has a pair of outlet ports 50 and 52 which are communicating with the valve chambers 42 and 44, respectively. The end of the casing opposite to the valve chambers 42 and 44 is open and the open end is closed by a planar plate 58. A passage plate 64 is attached to the outside of the planar plate 58. In the expansion chambers 38 and 40, there are respectively provided conduit pipes 54 and 56 which have one ends supported by the planar plate 58 and the other ends extending through the end wall 36a to open to the valve chambers 42 and 44, respectively.

Referring to FIG. 3, it will be noted that the passage plate 64 is formed with a groove defining the aforementioned air inlet passage 66 which has an inlet end connected with the air cleaner 10 which is not shown in FIG. 3. The passage 66 further has outlet ports 72 and 74 which are formed in the planar plate 58 to open to the expansion chambers 38 and 40, respectively. The passage plate 64 is also formed with further grooves defining the connecting passages 68 and 70 which have one ends connected through ports 76 and 78 in the plate 58 with the expansion chambers 38 and 40, respectively. The other ends of the connecting passages 68 and 70 are connected through ports 60 and 62 in the plate 58 with the conduit pipes 54 and 56, respectively.

Referring to FIGS. 1 and 2, it will be noted that the aforementioned non-return valves 46 and 48 are provided in the valve chambers 42 and 44, respectively. The non-return valves 46 and 48 are located to open only toward the outlet ports 50 and 52, respectively. In the valve chambers 42 and 44, there are air filters 80 and 82, respectively.

In operation, the secondary air drawn through the air cleaner 10 is passed through the air inlet passage 66 formed in the passage plate 64 and the ports 72 and 74 into the expansion chambers 38 and 40. The air in the expansion chamber 38 is then passed through the port 76, the passage 68 in the passage plate 64 and the port 60 into the connecting conduit pipe 54. Thereafter, the air is introduced from the pipe 54 into the valve chamber 42 from where the air is passed through the non-return valve 46 and the outlet port 50 to the exhaust passage 34. Similarly, the air in the expansion chamber 40 is passed through the port 78, the passage 70 and the port 62 into the connecting conduit pipe 56. The air in the pipe 56 is then introduced into the valve chamber 44 from where the air is then passed through the non-return valve 48 and the outlet port 52 to the exhaust passage 34. It will be understood that in the structure described above, the expansion chambers 38 and 40 are connected with the valve chambers 42 and 44 respectively through the elongated connecting conduit pipes 54 and 56 so that a sufficient quantity of secondary air can be drawn into the exhaust passage 34 under the suction pressure produced in the exhaust passage 34. Further, since the connecting conduit pipes 54 and 56 are located respectively in the expansion chambers 38 and 40, it is possible to arrange the pipes in a compact manner while ensuring desired lengths of the pipes 54 and 56. By locating the pipes 54 and 56 in the expansion chambers 38 and 40, it becomes possible to prevent noise produced at the pipes from being dissipated outside the secondary air supply system.

The invention has thus been shown and described with reference to a specific structure, however, it should be noted that the invention is in no way limited to the details of the illustrated structures but changes and modifications may be made without departing from the scope of the appended claims.

What is claimed is:

1. A secondary air supply system for an engine exhaust system including casing means having first chamber means and second chamber means which is smaller in volume than the first chamber means, secondary air passage means comprising a first air passage connecting said second chamber means with an engine exhaust passage means, a second air passage connecting said first chamber means with said second chamber means and a third air passage connecting said first chamber means with the atmosphere, non-return valve means provided in said second chamber means to open only toward the engine exhaust passage means, said casing means having side wall means, cover plate means attached to said side wall means for providing at least part of said secondary air passage means between said side wall means and said cover plate means.

2. A secondary air supply system in accordance with claim 1 in which at least a part of said second and third air passages is formed between said side wall means and said cover plate means.

3. A secondary air supply system in accordance with claim 1 said side wall means is at a side of the casing means opposite to said non-return valve means.

4. A secondary air supply system in accordance with claim 1 in which said part of the secondary air passage means provided between the side wall means and the cover plate means includes at least one passage which is formed in a waved configuration.

5. A secondary air supply system in accordance with claim 1 in which said side wall means is defined by a substantially planar plate, said cover plate means including groove means formed at a surface opposing to said planar plate to define said part of the secondary air supply passage means.

6. A secondary air supply system in accordance with claim 1 in which said non-return valve means includes a valve element, air filter means being located upstream the valve element.

7. A secondary air supply system including casing means having first chamber means and second chamber means which is smaller than and separated from the first chamber means by partition wall means, first air passage means having one end opened to said second chamber means and the other end opened to engine exhaust passage means, second air passage means having one end opened through said partition wall means to said second chamber means and extending through said first chamber means, said second air passage means further extending through side wall means at a side opposite to the second chamber means to the exterior of the casing means and having the other end opened through said side wall means to said first chamber means, third air passage means having one end opened to said first chamber means and the other end opened to the atmosphere, non-return valve means provided in said second chamber means to open only toward said engine exhaust passage means.

8. A secondary air supply system in accordance with claim 7 in which said third air passage means is opened to the atmosphere through said side wall means in the casing means.

9. A secondary air supply system in accordance with claim 7 in which said second air passage means includes pipe means which extends between said partition wall means and said side wall means.

10. A secondary air supply system including a hollow casing having one end closed by an end wall and the other end open, said end wall having a recess at an external surface, a substantially planar plate attached to said casing to close said other end of the casing, a conduit extending through said casing between the end wall and said planar plate, said conduit having one end opened through said end wall to said recess and the other end opened through said planar plate to the outside of the planar plate, a cover plate attached to the outside of said planar plate to define with said planar plate a first passage connecting said conduit with the inside of said casing and a second passage opening the inside of the casing to the atmosphere, a valve cover attached to said end wall for closing an open end of said recess to define a valve chamber, a third passage connecting said recess with an engine exhaust passage, a non-return valve provided in said recess to open only toward said exhaust passage.

11. A secondary air supply system in accordance with claim 10 in which said first and second air passages are formed by grooves in said cover plate.

12. A secondary air supply system in accordance with claim 10 in which said conduit is supported by said cover plate, said cover plate being formed with a plurality of grooves defining said first and second passages which are communicating with said inside of the casing and the conduit through openings formed in said planar plate.

13. A secondary air supply system in accordance with claim 7 in which said casing means includes a pair of integrally formed cavities defining a pair of said first chamber means and a pair of integrally formed cavities defining a pair of said second chamber means, said pair of second chamber means being connected independently with said engine exhaust passage means.

* * * * *